(12) United States Patent
Lefler

(10) Patent No.: US 9,091,588 B2
(45) Date of Patent: Jul. 28, 2015

(54) SYSTEM AND METHOD OF MECHANICAL FAULT DETECTION BASED ON SIGNATURE DETECTION

(75) Inventor: Kenneth A. Lefler, Silver Spring, MD (US)

(73) Assignee: PROGNOST SYSTEMS GMBH (DE)

( * ) Notice: Subject to any disclaimer, the term of this patent is extended or adjusted under 35 U.S.C. 154(b) by 1014 days.

(21) Appl. No.: 13/117,545

(22) Filed: May 27, 2011

(65) Prior Publication Data

US 2011/0290024 A1    Dec. 1, 2011

Related U.S. Application Data

(60) Provisional application No. 61/349,424, filed on May 28, 2010.

(51) Int. Cl.
  *G01H 13/00* (2006.01)
  *G01H 1/00* (2006.01)
  *G01H 3/08* (2006.01)

(52) U.S. Cl.
  CPC .................. *G01H 1/003* (2013.01); *G01H 3/08* (2013.01); *G01H 13/00* (2013.01)

(58) Field of Classification Search
  CPC ......... G01H 1/00; G01H 13/00; G01H 1/003; G01H 3/08; G01M 7/00; G01N 29/045; G01N 29/12; G01N 2291/014
  USPC .................................................... 73/660, 659
  See application file for complete search history.

(56) References Cited

U.S. PATENT DOCUMENTS

| | | | | |
|---|---|---|---|---|
| 4,989,159 A | * | 1/1991 | Liszka et al. | 702/56 |
| 6,321,602 B1 | * | 11/2001 | Ben-Romdhane | 73/660 |
| 2002/0083773 A1 | * | 7/2002 | Ben-Romdhane | 73/660 |
| 2003/0130810 A1 | * | 7/2003 | Smulders et al. | 702/56 |
| 2006/0167659 A1 | * | 7/2006 | Miyasaka et al. | 702/185 |
| 2008/0010039 A1 | * | 1/2008 | Miyasaka et al. | 702/183 |

* cited by examiner

*Primary Examiner* — Laura Martin
*Assistant Examiner* — Rose M Miller
(74) *Attorney, Agent, or Firm* — J.A. Lindeman & Co., PLLC

(57) ABSTRACT

A mechanical fault detection method and system computes a similarity index to quantify the relationship of a measured spectral signature to a theoretical fault signature. A vibration sensor detects vibrations on machinery with rotating components. The vibration sensor generates a representation of the vibration and provides it to a vibration analyzer. The vibration analyzer is configured to identify peak amplitudes in the generated representation, determine a corresponding frequency for each of the peak amplitudes, and match the determined corresponding frequencies to a theoretical set of frequencies. The analyzer determines a number of matching frequencies and identifies a detection condition when the number of matching frequencies meets a predetermined criterion. The system and method combines vibration amplitude threshold detection with similarity index threshold detection to significantly reduce false fault alarms and false pass errors. The system and method is also used to identify incorrect vibration amplitude thresholds.

23 Claims, 8 Drawing Sheets

This Plot is a Convenient Data Mining Tool for Identifying Thresholds that are too Low (Causing False Alarms in the Upper Left Corner) or too High (Causing False Passes in the Lower Right Corner).

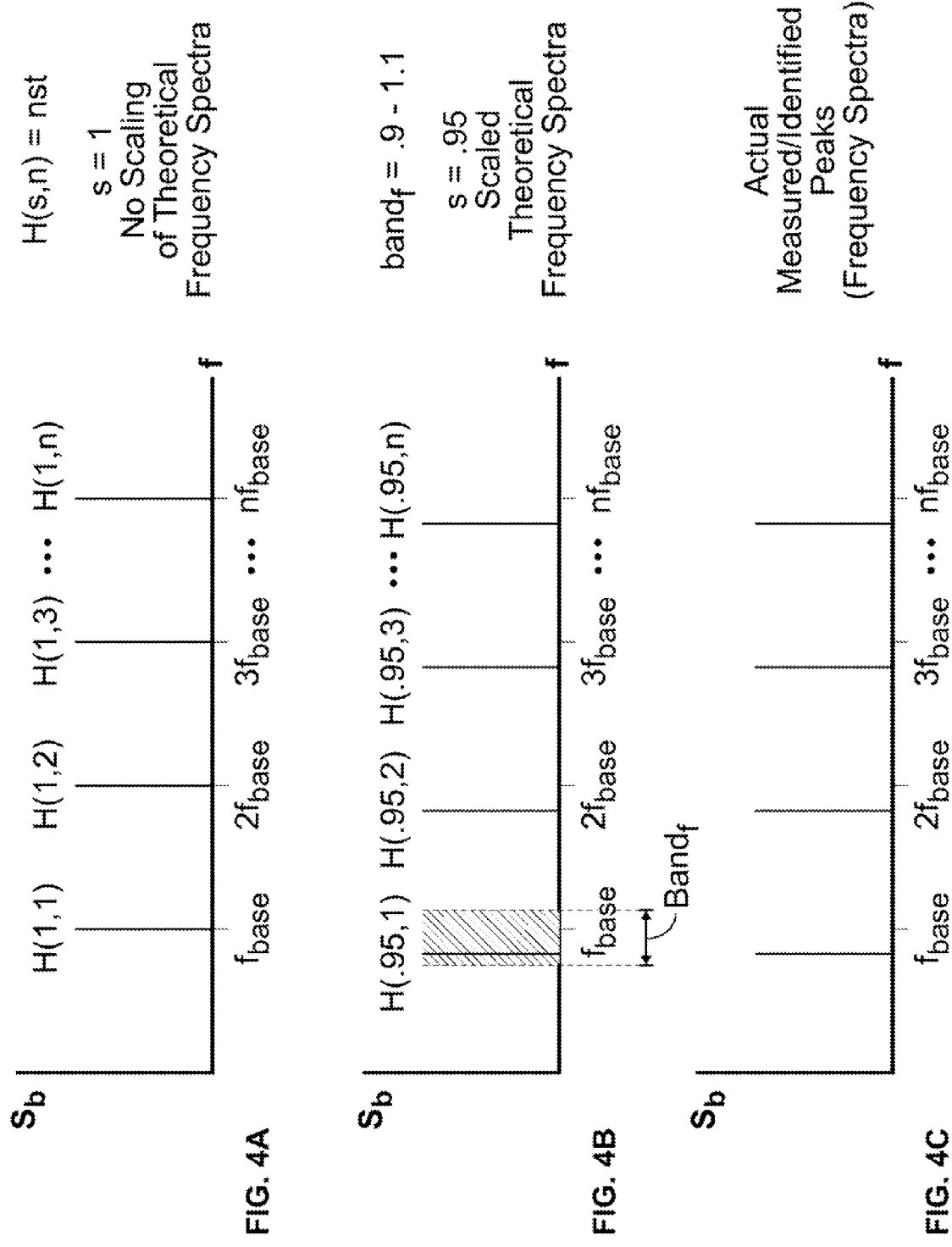

SYSTEM AND METHOD OF MECHANICAL FAULT DETECTION BASED ON SIGNATURE DETECTION

CROSS-REFERENCE TO RELATED APPLICATIONS

This application claims priority to U.S. Provisional Patent Application No. 61/349,424, filed on May 28, 2010, the entire contents of which are incorporated herein by reference.

TECHNICAL FIELD

This technology generally relates to systems, devices, and methods for detecting and analyzing faults in mechanical components of operating rotating machinery and more specifically for quantifying the similarity of a measured spectral signature to a theoretical fault signature.

BACKGROUND

The productive operation of industrial machinery requires machines to be in good working order. Methods of machine condition monitoring have been developed to detect component defects before catastrophic failure. One method is a spectral analysis of the vibration produce by the machine. Faults such as shaft imbalance, misalignment, looseness, bearing faults (such as cage, roller, and race faults), and gear faults produce characteristic fault signatures. These signatures include a set of specific spectral vibration frequencies. Often, the fault signature is a set of frequencies proportional to the rotation rate of the shafts in the machine. Knowing the rotation speed of each shaft and the physical properties of the component allows the calculation of fault frequencies associated with a specific type of fault for a particular component. For example, a bearing outer race will produce a harmonic set of frequencies with a fundamental frequency at the rolling element outer race pass frequency. Once calculated, these frequencies can be monitored to aid in detecting mechanical faults in the equipment.

Commercial vibration monitoring systems are available that track the spectral amplitudes in a narrow frequency band around these expected frequencies. A narrow band is used rather than the exact fault frequency because the rotation speed may not be known precisely and because components, such as bearings, for example, can slip slightly causing the fault to appear at a slightly different frequency than the theoretically calculated fault value. The bandwidth of fault frequencies is chosen to be greater than the signature frequency deviation expected due to rotation speed inaccuracies and possible slippage. One fault measure, the spectral amplitude sum, $S_b$, is the sum of all spectral amplitudes falling within the narrow frequency bands around each theoretical fault frequency associated with the component fault. This spectral amplitude sum is interpreted as a measure of the severity of a specific component fault.

This method is inadequate in many cases as it suffers from several problems. For example, there can be interfering vibration sources that happen to produce a vibration frequency which falls into one of the frequency band regions. This interfering vibration source will contribute to the spectral amplitude sum, but it is not associated with the actual fault of interest. For example, a gear mesh frequency may fall in one of the harmonic bands of a bearing fault. Another problem with this spectral amplitude sum technique is that spectral background amplitudes may rise, thereby increasing the sum of all spectral amplitudes falling within the frequency bands around the theoretical fault frequencies. This would mistakenly be interpreted as an increase in the fault severity. These problems can lead to false alarms as to the presence of a component fault. Additionally, an incorrectly established threshold can also lead to a false alarm or a false pass condition.

A mechanical fault detection and analysis system should be flexible and accurate. Different approaches have been used in the past to provide adaptable and responsive techniques that are free from errors.

SUMMARY

In this disclosure, many of the examples discuss systems and methods used to detect, analyze, and quantify mechanical faults and mechanical fault data in machines, including machines with rotating components. It should be understood that the systems and techniques in accordance with the claimed invention can also provide mechanical fault detection, analysis, and quantification of other mechanical faults, depending upon the type of machine and the type of machine components employed.

One example of the claimed invention is a system and method for detecting and analyzing faults in mechanical components of operating rotating machinery by quantifying the similarity of a measured spectral signature to a theoretical fault signature. This relationship is detected and analyzed, and a determination is made regarding the fault at issue. Based upon the detection and analysis, the determination can include a full spectrum of possibilities. For example, a determination can be made that there is no fault, that the detected fault is a possible false alarm, that the detected fault is a possible fault that should cause an alarm, that the detected fault is a possible fault that should cause a warning, that the detected fault is a possible early fault, that the detected fault is a probable fault that should cause an alarm, that the detected fault is a probable fault that should cause an alert, that the detected fault is a probable fault that should cause a warning, and that the detected fault is a possible false pass.

One example of a mechanical fault detection method and system computes a similarity index to quantify the relationship of an actual measured spectral signature to a theoretical fault signature. The system and method uses a vibration sensor to detect mechanical faults on machinery with rotating components and interconnected components. The system and method for detecting mechanical faults combines vibration amplitude threshold detection with identification of a number of spectral peaks and computes a similarity index to significantly reduce false fault alarms and false pass errors. The system and method is also used to identify incorrect vibration amplitude thresholds and to identify the correct number and type of spectral peaks and their corresponding frequencies.

In the past, simple amplitude sum thresholding techniques have been limited by the fact that all information related to the distribution of energy is lost by the time the summing step is performed. A sum may be high because of the contribution of a single frequency that has grown to a large amplitude or by a harmonic set of frequencies, each of which are growing in amplitude. The amplitude sum in and of itself does not provide enough information to qualify the detected fault.

Many of the theoretical fault signatures of common mechanical components in rotating machinery are harmonic sets, and true faults should have significantly higher-than-normal amplitudes at each of the frequencies in the harmonic set. A high amplitude at a single frequency in the set is not consistent with the theoretical signature. In the claimed invention, a similarity index is computed to capture in a numerical form how similar the distribution of energy in the actual spectral signature is to the theoretical signature. For example, a similarity index with a value of 0 indicates no similarity between the actual spectral signature and the theoretical signature, while a similarity index of 1 indicates perfect similarity. In addition to a conventional amplitude sum quantification, the determination of the similarity index provides a second value that is useful in detecting mechanical faults. A true fault is detected by observing an amplitude sum that is higher than a determined amplitude threshold and a similarity index that is higher than a determined similarity index threshold.

The combination of these two values allows the evaluation of the correctness of the amplitude threshold. A high similarity index indicates the probable presence of a fault, so the vibration amplitude should be higher than normal and possibly higher than the threshold. If the determined (vibration) amplitude is lower, then a possible false pass condition is indicated. A vibration amplitude greater than the amplitude threshold would also indicate the likely presence of a fault. If the similarity index is low, then the amplitude threshold may be too low, and a possible false alarm is indicated.

The systems and methods of the claimed invention provide a flexible and accurate mechanical fault detection and analysis system. By computing a similarity index to be used in conjunction with an amplitude sum, the systems and methods of the claimed invention provide adaptable and responsive fault detection techniques that are free from errors.

An example system and method of mechanical fault detection based on signature detection includes a vibration sensor coupled to a machine to detect and sense the vibration produced by the machine components. The vibration sensor can include an accelerometer and related signal generation circuitry. The vibration sensor generates a signal that is indicative of the vibrational movement of at least one component of the machine. The vibration sensor is operatively coupled to a vibration analyzer that converts the received vibration sensor signal into spectral data illustrative of the vibrational movement of the components of the machine. The vibration analyzer can be a computer with a processor and memory programmed to carry out the vibration detection and analysis algorithm of the claimed invention.

The vibration analyzer can be a personal computer including a processor and memory and is programmed to carry out a method of the claimed invention. Vibration analyzer can include I/O devices, such as keyboards, pointing devices, mice, trackballs, and the like and a display unit upon which a user can view and otherwise interact with the collected data and displayed spectra. The vibration analyzer and processor are programmed to display a spectrum, and to interpret and analyze spectral data. The vibration analyzer can also include networking capabilities to receive or transmit data to remote locations as necessary. The vibration analyzer provides access to a database for the analysis of the spectral data by a processor (not shown separately) as well as to access, store, and retrieve theoretical spectral data for the machines and/or components under investigation.

One example of the claimed mechanical fault detection system is a system that detects a mechanical fault based on signature detection. One example method for detecting a spectral signature includes identifying peak amplitudes in a frequency spectrum, determining a corresponding frequency for each of the peak amplitudes, and matching the determined corresponding frequencies to a theoretical set of frequencies that correspond to a spectral signature of interest. The number of matching frequencies is determined, and a detection condition is identified when the number of matching frequencies meets a predetermined criteria. The predetermined criteria can include meeting or exceeding a threshold number of identified peak amplitudes and corresponding frequencies that match the theoretical set of frequencies, for example.

Another example of a method for detecting a spectral signature includes removing known interfering frequencies from the frequency spectrum. For example, one method for detecting a spectral signature includes applying a pitch detection filter to the frequency spectrum to identify harmonic sets of frequencies present in the frequency spectrum that are distinct from the spectral signature of interest and removing the distinct harmonic sets of frequencies from the frequency spectrum.

One method for detecting a spectral signature can include computing the sum of the spectral peak amplitudes with frequencies matching the theoretical set of frequencies, comparing the computed sum of spectral amplitudes to a sum threshold, comparing the number of matching frequencies to a number threshold, and declaring a final detection condition when the number of matching frequencies is at or above the number threshold and the computed sum of spectral amplitudes is at or above the sum threshold.

Also, one method for detecting a spectral signature can further include computing the sum of the spectral peak amplitudes with frequencies matching the theoretical set of frequencies, comparing the computed sum of spectral amplitudes to a sum threshold, comparing the number of matching frequencies to a number threshold, and declaring a false alarm condition when the number of matching frequencies is below the number threshold and the computed sum of spectral amplitudes is at or above the sum threshold.

A method for detecting a spectral signature can also include computing the sum of the spectral peak amplitudes with frequencies matching the theoretical set of frequencies, comparing the computed sum of spectral amplitudes to a sum threshold, comparing the number of matching frequencies to a number threshold, and declaring a false pass condition when the number of matching frequencies is at or above the number threshold and the computed sum of spectral amplitudes is below the sum threshold.

A method for detecting a spectral signature can also include computing the sum of the spectral peak amplitudes with frequencies matching the theoretical set of frequencies, applying a sum threshold to the computed sum of spectral amplitudes, applying a similarity threshold to the produced similarity index, and declaring a final detection condition when the computed sum is at or above the sum threshold and the produced similarity index is at or above the similarity threshold.

An example method for detecting a spectral signature can also include computing the sum of the spectral peak amplitudes with frequencies matching the theoretical set of frequencies, applying a sum threshold to the computed sum of spectral amplitudes, applying a similarity threshold to the produced similarity index, and declaring a false alarm condition when the computed sum is at or above the sum threshold and the produced similarity index is below the similarity threshold.

Further, a method for detecting a spectral signature can include computing the sum of the spectral peak amplitudes with frequencies matching the theoretical set of frequencies, applying a sum threshold to the computed sum of spectral amplitudes, applying a similarity threshold to the produced similarity index, and declaring a false pass condition when the computed sum is below the sum threshold and the produced similarity index is at or above the similarity threshold.

Additionally, a method for detecting a spectral signature can further include computing a sum of spectral amplitudes within frequency bands around the theoretical frequencies, comparing the computed sum of spectral amplitudes to a sum threshold, comparing the number of matching frequencies to a number threshold, and declaring a final detection condition when the number of matching frequencies is at or above the number threshold and the computed sum of spectral amplitudes is at or above the sum threshold.

One method for detecting a spectral signature also includes computing a sum of spectral amplitudes within frequency bands around the theoretical frequencies, comparing the computed sum of spectral amplitudes to a sum threshold, comparing the number of matching frequencies to a number threshold, and then declaring a false alarm when the number of matching frequencies is below the number threshold and the computed sum of spectral amplitudes is at or above the sum threshold.

Similarly, another method for detecting a spectral signature includes computing a sum of spectral amplitudes within frequency bands around the theoretical frequencies, comparing the computed sum of spectral amplitudes to a sum threshold, comparing the number of matching frequencies to a number threshold, and declaring a false pass condition when the number of matching frequencies is at or above the number threshold and the computed sum of spectral amplitudes is below the sum threshold.

An additional method for detecting a spectral signature includes applying a squashing function to the number of the identified peak amplitudes that match the theoretical set of frequencies and producing a similarity index based upon the applied squashing function. The similarity index is between the range of 0 to 1, where no matches of the identified peak amplitudes and their corresponding frequencies to the theoretical set of frequencies corresponds to a similarity index of substantially 0 and all matches of identified peak amplitudes and their corresponding frequencies to the theoretical set of frequencies corresponds to a similarity index of substantially 1.

One example method for detecting a spectral signature includes computing a sum of spectral amplitudes in frequency bands around the theoretical frequencies, and applying a sum threshold to the computed sum of spectral amplitudes. The method also includes applying a similarity threshold to the produced similarity index and declaring a final detection condition when the computed sum is at or above the sum threshold and the produced similarity index is at or above the similarity threshold.

One method for detecting a spectral signature also includes computing a sum of spectral amplitudes in frequency bands around the theoretical frequencies, applying a sum threshold to the computed sum of spectral amplitudes, applying a similarity threshold to the produced similarity index, and declaring a false alarm condition when the computed sum is at or above the sum threshold and the produced similarity index is below the similarity threshold.

An additional method for detecting a spectral signature includes computing a sum of spectral amplitudes in frequency bands around the theoretical frequencies, applying a sum threshold to the computed sum of spectral amplitudes, applying a similarity threshold to the produced similarity index, and declaring a false pass condition when the computed sum is below the sum threshold and the produced similarity index is at or above the similarity threshold.

An example method for detecting a spectral signature includes removing known interfering frequencies from the frequency spectrum. Similarly, an additional method for detecting a spectral signature includes altering the theoretical set of frequencies that correspond to the spectral signature of interest using a scale factor, wherein the scale factor is determined by fitting the frequencies of the matched frequencies to the theoretical set of frequencies to generate a maximum number of matching frequencies. The scale factor can be based upon an uncertainty in the rotational speed of a machine from which the spectral signature is generated, for example, as well as other factors.

Another method for detecting a spectral signature in accordance with the claimed invention includes a theoretical set of frequencies that includes a base harmonic frequency and a set of sideband frequencies. The number of matched frequencies can include a number of matched base frequencies that correspond to the base harmonic frequency and a number of matched sideband frequencies that correspond to the set of sideband frequencies. The final detection condition can then be declared when the computed sum of the spectral amplitudes is at or above the sum threshold, the number of matched base frequencies that correspond to the base harmonic frequency is at or above a base frequency threshold, and the number of matched sideband frequencies that correspond to the set of sideband frequencies is at or above a sideband threshold.

A system for detecting a spectral signature of a machine in accordance with the claimed invention includes a vibration sensor operatively coupled to the machine and configured to detect a vibration of the machine and to generate a representation of the vibration. The system also includes a computer readable storage medium configured to include a theoretical set of frequencies that correspond to a spectral signature of interest and a vibration analyzer configured to receive the generated representation of the machine vibration from the vibration sensor. The vibration analyzer is further configured to identify peak amplitudes in the generated representation, to determine a corresponding frequency for each of the peak amplitudes, to match the determined corresponding frequencies to the theoretical set of frequencies stored on the computer readable media, to determine a number of matching frequencies, and to identify a detection condition when the number of matching frequencies meets a predetermined criteria.

In one example of the claimed invention, a computer readable medium has instructions stored on it for carrying out the mechanical fault detection method. A computer readable medium of the claimed invention includes computer-readable instructions stored on it to cause at least one processor to perform steps of detecting spectral signatures and comparing the detected signatures and components of the signatures to established theoretical frequency spectra. For example, in one example of the claimed invention, an article of manufacture includes a non-transitory computer-readable data storage medium including computer-readable instructions stored thereon for causing a processor to perform a method of detecting a spectral signature of a machine. The method includes identifying peak amplitudes in a frequency spectrum, determining a corresponding frequency for each of the peak amplitudes, matching the determined corresponding frequencies to a theoretical set of frequencies that correspond to a spectral signature of interest, determining a number of the matching frequencies, comparing the number of matching frequencies to a number threshold, computing a sum of spectral amplitudes of the theoretical frequencies, comparing the computed sum of spectral amplitudes to a sum threshold, and declaring a final detection condition when the number of matching frequencies is at or above the number threshold and the computed sum of spectral amplitudes is at or above the sum threshold.

The systems and methods of the claimed invention provide a flexible and accurate mechanical fault detection and analysis system. By computing a similarity index to be used in conjunction with an amplitude sum, the systems and methods of the claimed invention provide adaptable and responsive fault detection techniques that are free from errors.

These and other advantages, aspects, and features will become more apparent from the following detailed description when viewed in conjunction with the accompanying drawings. Non-limiting and non-exhaustive embodiments are described with reference to the following drawings. Accordingly, the drawings and descriptions below are to be regarded as illustrative in nature, and not as restrictive

BRIEF DESCRIPTION OF THE DRAWINGS

FIGS. 4A-4C illustrate a theoretical set of frequencies that correspond to a spectral signature of interest, a shifted theoretical set of frequencies, and a measured spectral signature.

DETAILED DESCRIPTION

One example of a mechanical fault detection method and system of the claimed invention computes a similarity index to quantify the relationship of an actual measured spectral signature to a theoretical fault signature.

Figure 1:
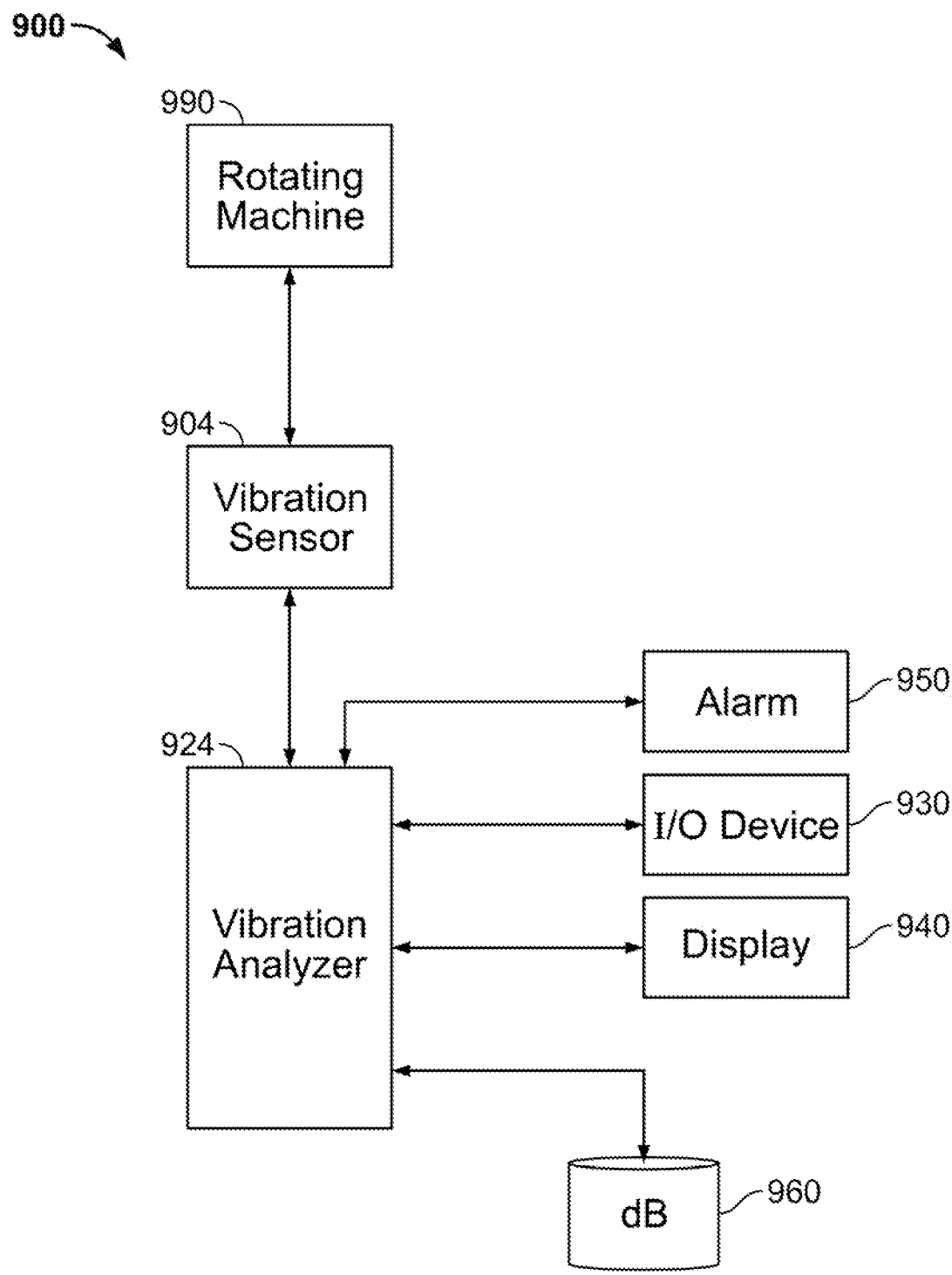
FIG. 1 is an example fault detection system in accordance with the claimed invention.

FIG. 1 is an exemplary system 900 used to detect, analyze, and compute a similarity index. System 900 includes a vibration sensor 904. Vibration sensor 904 can be placed on, in, or near a machine to detect and sense the vibration produced by the machinery components. For example, vibration sensor 904 is used to sense vibrational movements of rotating machine 990. Vibration sensor 904 generates a signal that is indicative of the vibrational movement of at least one component of rotating machine 990. The vibration sensor 904 can include at least one accelerometer that can be used to detect vibrational amplitudes of the components of the rotating machine 990.

Vibration sensor 904 is integrated with vibration analyzer 924 that receives the signal or signals from the vibration sensor 904 and converts the signal into spectral data illustrative of the vibrational movement of the components of the machine 990. The conversion of the signal into spectral data can be performed by digitizing the data and performing a Fast Fourier Transform, for example. The vibration analyzer can include a vibration amplitude threshold detector (not shown separately) and a spectral peak threshold detector (not shown separately). Of course, multiple sensors can be used in the system 900 and likewise, multiple vibration analyzers 924 can also be used in the system 900, such as when more than one components of machine 990 is evaluated. For clarity and brevity, a single vibration sensor 904 and a single vibration sensor data analyzer 924 is shown in FIG. 1.

The vibration analyzer 924 can be a personal computer including a processor and memory programmed to carry out a method of the claimed invention. Vibration analyzer 924 can include I/O devices, such as I/O device 930 and a display unit 940 upon which a user can view and otherwise interact with the collected data and displayed spectra. The I/O devices can include keyboards, mice, pointing devices, storage units, memory devices, and the like. The vibration analyzer 924 utilizes a processor programmed to display a frequency spectrum, and to interpret and analyze spectral data. The vibration analyzer 924 can also include networking capabilities to receive or transmit data to and from remote locations as necessary. The vibration analyzer 924 provides access to a database 960 for the analysis of the spectral data by the processor (not shown separately) and for calculation, storage, and retrieval of theoretical fault signature spectra.

The data analyzer 924 retrieves a theoretical signature from database 960 and applies a method detailed below to the spectral data. The data analyzer 924 can determine if the theoretical signature is present in a measured frequency spectrum and if the amplitude of the actual detected signature in the measured spectral data is sufficiently large to activate an alarm. Display unit 940 allows the user to examine the amplitude and signature information, and I/O device 930 allows the user to manipulate the data.

As outlined above and shown in FIGS. 4A-4C, a particular fault may generate a fault signature as shown as the theoretical fault signature in FIG. 4A, where an amplitude begins at a base frequency, $f_{base}$, and repeats periodically as a multiple of the base frequency $f_{base}$. The signature function is described as H(s, n) where n is a number that corresponds to the periodicity of the fault, and s is a scaling factor. The theoretical fault signature in FIG. 4A shows a periodic fault that occurs (that is, a peak amplitude is typically detected) at $f_{base}$, $2f_{base}$, $3f_{base}$, ... $nf_{base}$. In FIG. 4A, the scaling factor, s, is 1.0, and the theoretical fault signature is not shifted.

To better match a measured fault signature, the frequencies of a theoretical fault signature can be shifted by the scaling factor s. As shown in FIG. 4B, the theoretical fault frequencies can be shifted over a range of values (band$_f$). In FIG. 4B, band$_f$ is a range that is 0.2 wide. Using this range, a scaling factor s can be determined that best fits the actual measured/identified peaks of FIG. 4C. With a scaling factor s of 0.95, the theoretical frequency spectra best matches the actual spectra. The signature function H(s, n) of FIG. 4B is then represented as H(0.95,n).

Likewise, an additional method of the claimed invention can select a band of frequencies about a particular theoretical frequency. This method will identify a number of frequencies and generate an amplitude sum for the frequency band. Of course, multiple bands, such as on either side of the theoretical frequency can be used as well.

A match can then be made not only requiring an increase in the spectral amplitude sum, ($S_b$) to trigger the alarm, but by also requiring the presence of a statistically significant fault signature that is consistent with the theoretical fault signature.

For example, the fault signature of a bearing fault is illustrative. These fault signatures are a harmonic set consisting of integral multiples of a base frequency. In addition to the example of a discrete frequency with a peak amplitude, in the case of rolling bearing element and inner race faults, there are often additional sidebands around each base frequency harmonic. To capture the fault signature, it may often be necessary to include a range of frequencies when determining a sum of peak amplitude in order to properly capture the true fault signature. By varying scaling factors and the theoretical range of values, the method and algorithms of the claimed invention can be applied to any spectral signature that includes any number of spectral lines.

Figure 3A:
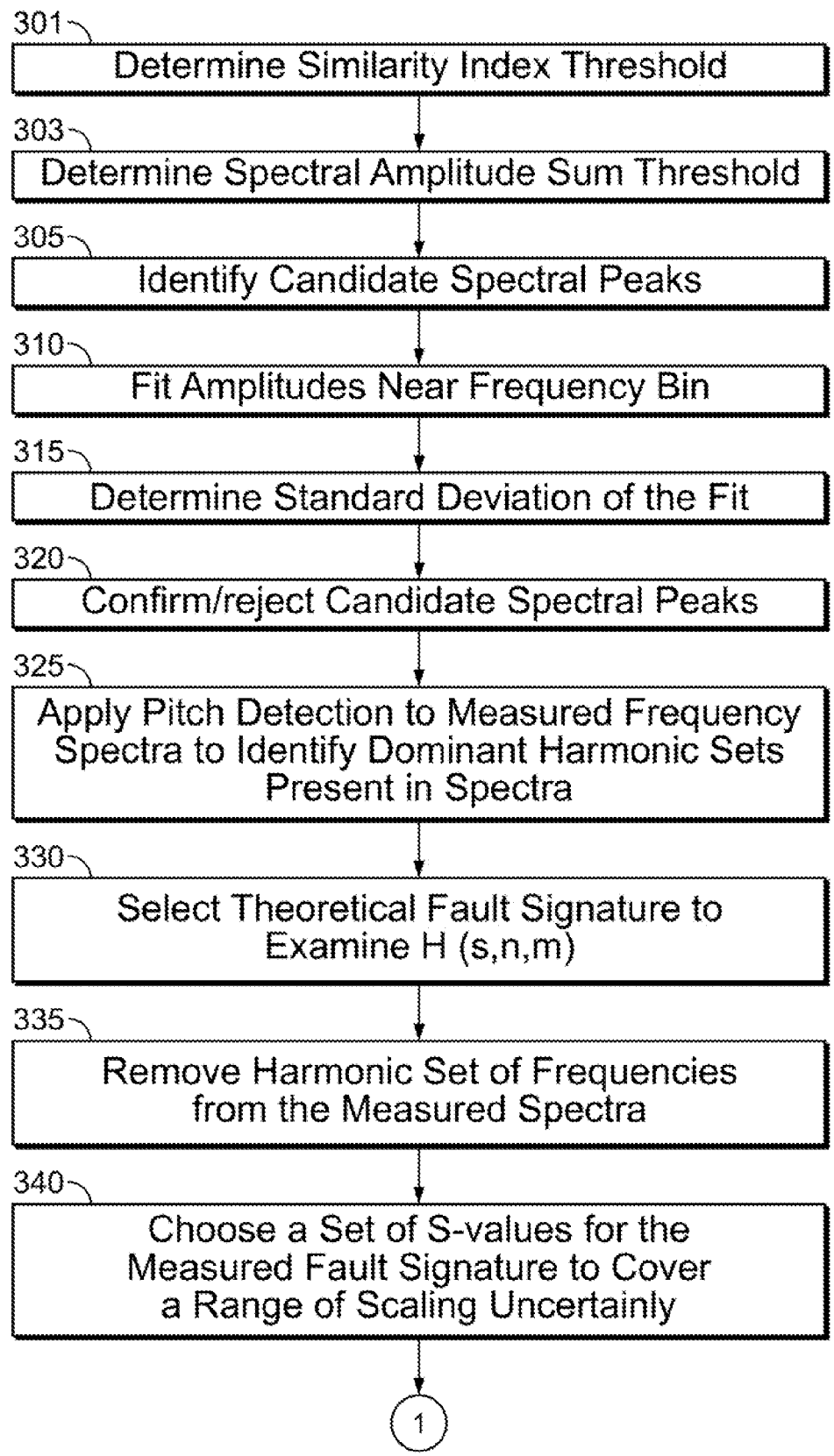
FIGS. 3A-3C is a flow diagram of a method and algorithm used to detect a spectral fault signature in accordance with the claimed invention.
Figure 3B:
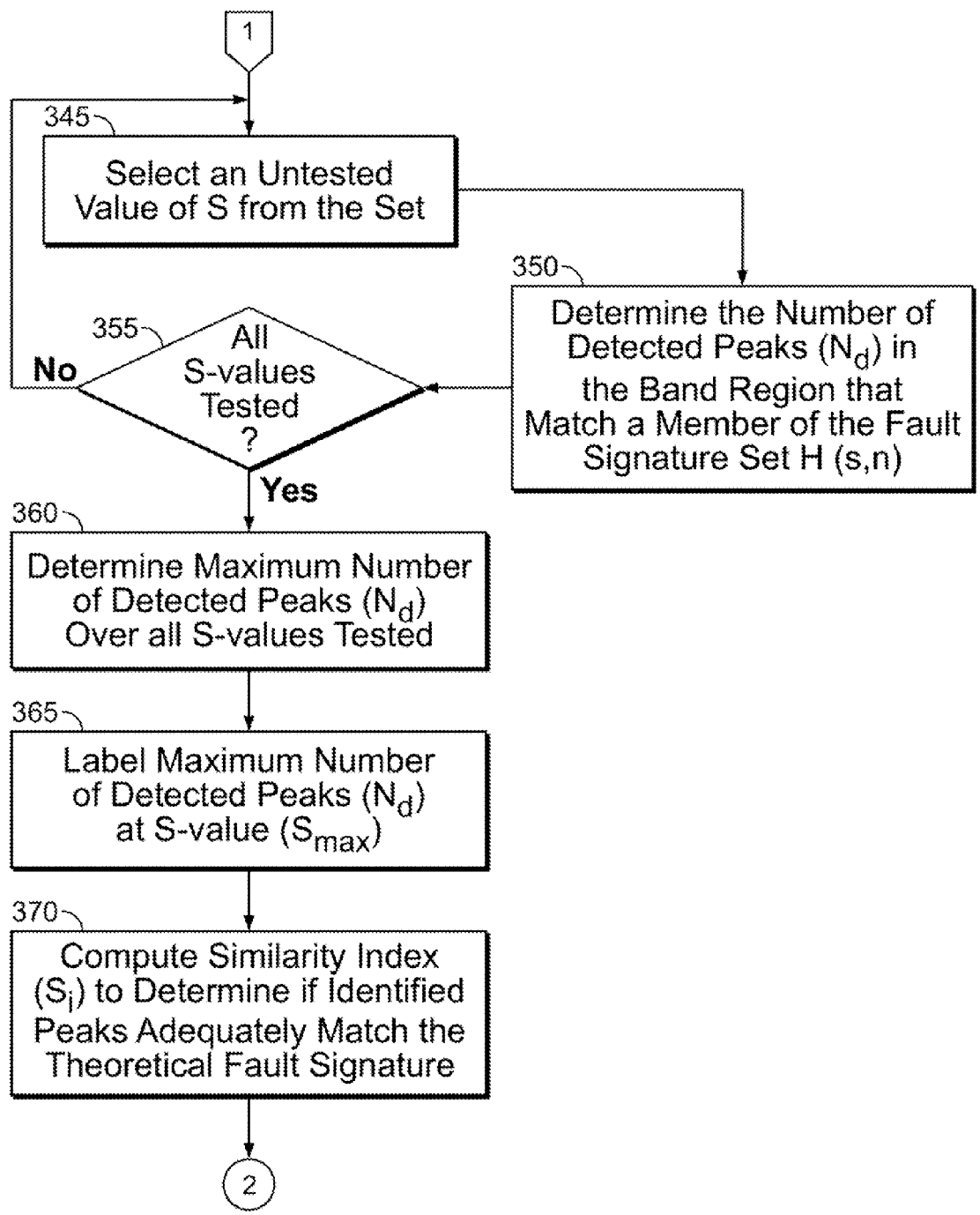
Figure 3C:
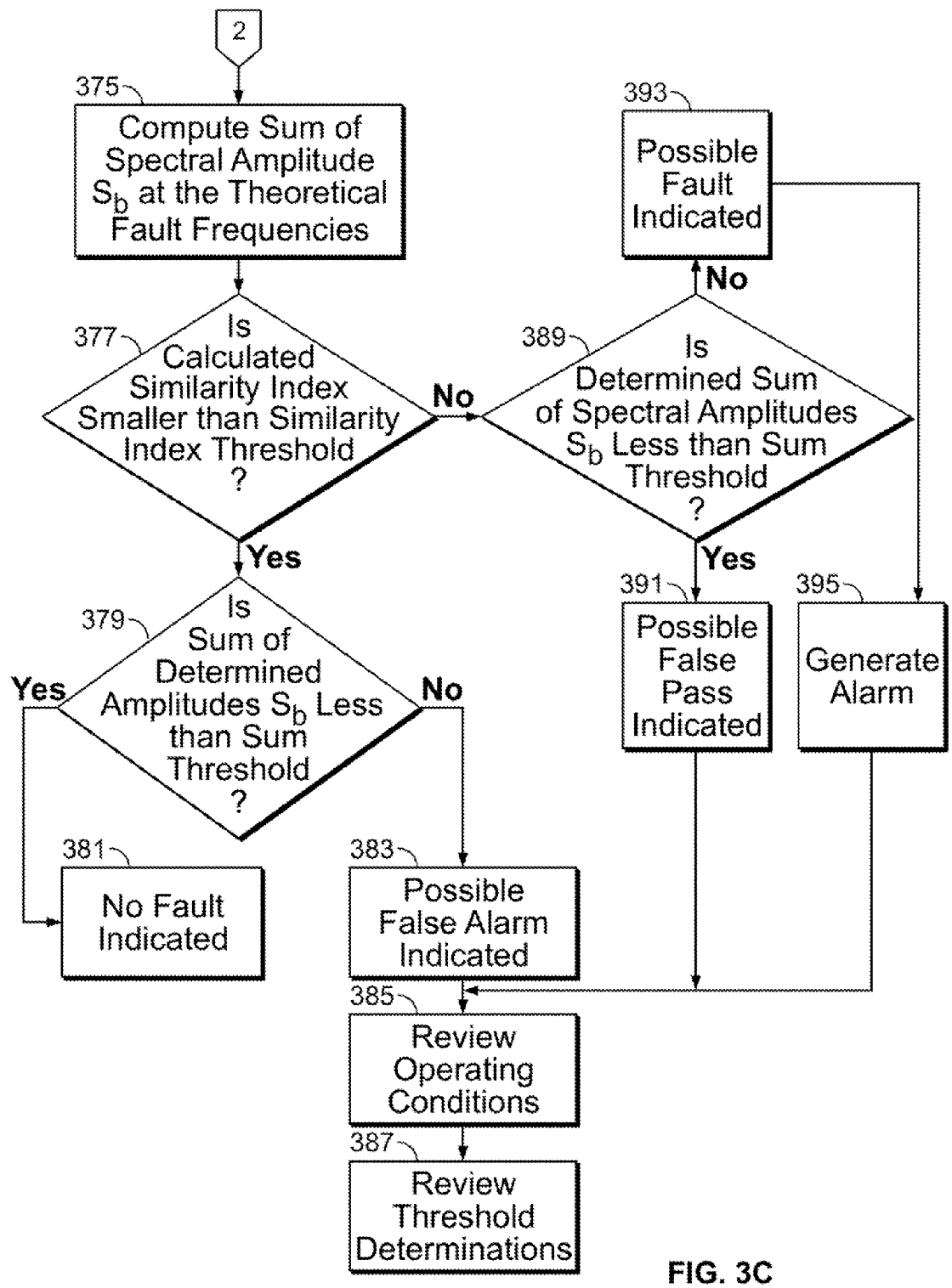
Figure 6A:
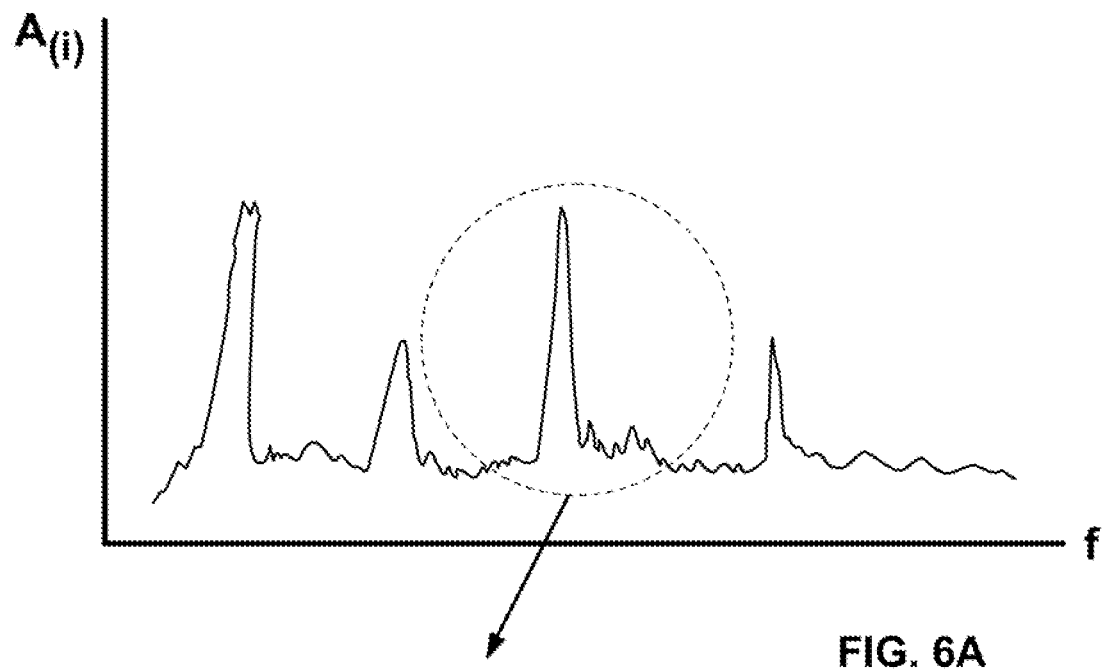
FIGS. 6A-6B show an example detected or measured frequency spectrum from which candidate spectral peaks are selected.
Figure 6B:
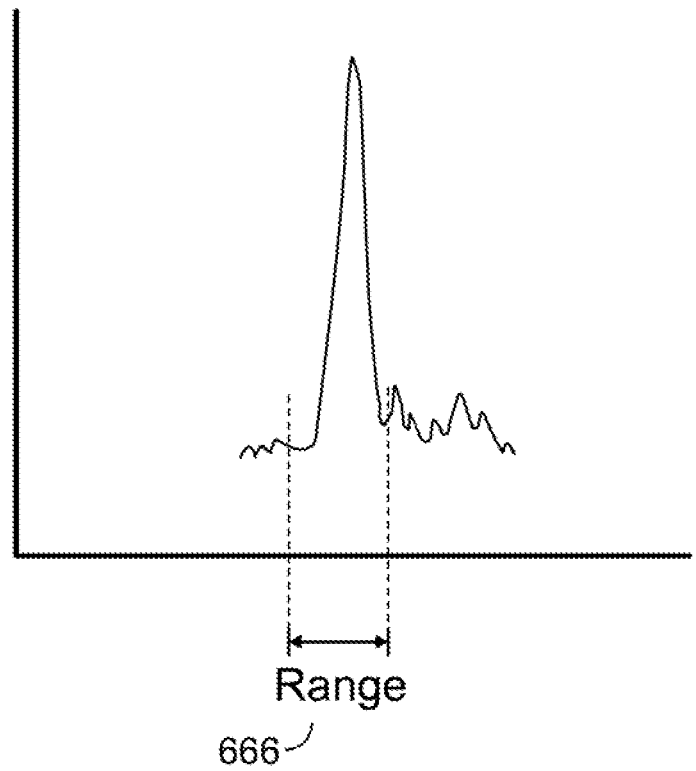

FIGS. 3A-3C illustrate a process and algorithm for determining a fault signature used in conjunction with the frequency spectrum shown in FIGS. 6A-6B. In block 301, a similarity index threshold is determined. The similarity index can be determined based upon the type of machine being observed, the type of fault a user is investigating, and based upon the experience of the user. In block 303, a spectral amplitude sum threshold is similarly determined.

In block 305, the candidate spectral peaks present in the data set are identified. A spectral peak is a frequency bin in the spectrum FIG. 6A whose amplitude A(i) is statistically greater than other frequency bins in a small frequency range (shown as reference element 666 in FIG. 6B) around the bin. In block 310, a fit, such as a linear least squares fit for example, is made to the points in the neighborhood of the bin, while the bin under evaluation and its immediate neighbors above and below it in frequency—whose amplitude may be due to spectral leakage—are omitted from the fit. Previously identified peaks can also be eliminated from the fit. In block 315, the standard deviation of the fit, $\sigma_f$, is computed from the deviations of the amplitudes of the included points from the estimated amplitudes $A_{est}$ computed from the fit parameters. In block 320, the spectral amplitude, A(i), of the bin i under evaluation is confirmed as a peak if the following equation holds true:

$$(A(i) - A_{est}(i))/\sigma_f > T_p$$

where $T_p$ is a peak threshold amplitude;
where A(i) is the spectral amplitude of bin i under evaluation
where $A_{est}(i)$ is the estimated amplitude computed from the fit parameters; and
where $\sigma_f$ is the standard deviation of the fit.

The peaks detected can be true members of the fault signature, interfering peaks from other sources, or random statistical fluctuations that appear as peaks. Most machinery vibration sources produce vibrations that are a harmonic set of frequencies. Pitch detection algorithms can include autocorrelation, cepstrum, and harmonic product spectrum, for example, to detect harmonic sets, as shown in block 325 of FIG. 3A. These algorithms can be employed to identify any dominant harmonic set that is not associated with the fault signature. If any of the peaks in the band region are associated with this set of frequencies, they can be ignored or removed in block 335. Ignoring these peaks will lower the probability of an accidental match of a peak to the signature.

In block 330, a theoretical fault signature is selected. For example, a theoretical fault signature characterized by H(s, n, m, . . . ) can be a function which generates the set of frequencies in the fault signature as a function of a scaling parameter s and integer factors n, m, and the like. As above, the scaling parameter s is often related to the speed (RPM) of the machine under evaluation. The integers n, m, and others, are used to identify particular members of the set of frequencies. The range of these integers is determined by the frequency range of the spectrum. As above, for the case of a simple harmonic set:

$$H(s,n) = nsf_{base}$$

where s is the speed of the machine;
and $f_{base}$ is an order-referenced base harmonic.

As outlined above, there can be a small range of possible scaling s values that are consistent with the uncertainty in RPM or component slip of the machine. In block 340 of FIG. 3A, a set of s-values for the measured fault signature is chosen to cover a frequency range of scaling uncertainty. In block 345 in FIG. 3B, an untested scaling value is selected and in block 350 the number of detected peaks $N_d$ in the frequency band region that match a frequency of the fault signature set, H(s, n, . . . ) is determined.

A match exists between a scaled theoretical frequency and a member of the actual data spectrum set if the frequency of a detected peak $Pf_i$ is within an allowed deviation d from a member n, m, . . . of the set H. The deviation can be determined prior to determining if a match exists, or can be iterative depending upon the number and type of matches. For example:

$$|P_{fi} - H(s,n,m, \ldots)| < d \text{ for some } n, m, \ldots$$

In block 355, the system checks to see if all scaling values have been tested. If additional untested scaling values remain, the process returns to block 345 and then to block 350 to determined the number of detected peaks $N_d$ in the frequency band region that match a frequency of the fault signature set. Once all scaling factors are tested, the process continues to block 360 where the maximum number of detected peaks over all the tested scaling factors is determined. In block 365, the maximum number of detected peaks $N_d(s)$ is noted as well as the scaling factor, $s_{max}$, that resulted in the maximum number of detected peaks.

In block 370, a similarity index, $S_i$, is computed based upon the maximum number of detected peaks $N_d(s)$ and the scaling factor that resulted in the maximum number of detected peaks. The similarity index characterizes the actual spectral signature and provides a measure of "closeness" to the theoretical fault signature. Signature detection can be extended by defining a similarity index $S_i$, which is a value ranging from 0 to 1 representing a statistically significant similarity (of the detected or measured frequencies) to the frequencies of the theoretical spectral signature. A squashing function is applied to the match count $N_d(s_{max})$ to enforce this range of values. An example squashing function is the logistic function:

$$P(t) = 1/(1 + e^{-t})$$

The similarity index is defined by:

$$S_i = 1/(1 + e^{-(Nd(smax) - N_m)/a})$$

where a is a tunable sensitivity value;
where $N_m$ is the inflection point of the squashing function—between no signature present and signature present conditions When $N_d(s_{max}) = N_m$, the similarity index is 0.5. As the number of matching peaks increases, the similarity index approaches 1. If all peaks match, the similarity index would be at or near 1. Likewise, if no matches to the peaks in the signature occur, the similarity index will be at or near 0. That is, if all peaks match, the similarity index is substantially 1. If no peaks match, the similarity index is substantially 0. The similarity index provides a scale with a range from 0 to 1 that provides a measure of how similar the detected frequencies are to the theoretical frequencies.

An evaluation is made to determine if the identified peaks adequately represents the fault signature. Since even a pure noise spectrum can randomly produce some peaks consistent with the signature, the count $N_d(s_{max})$ may be greater than 0 even when no true signature is present. For each signature, a threshold $N_t$ is defined. The signature is considered to be present if $N_d(s_{max}) > N_t$. If the signature consists of a main harmonic set and additional sidebands around each harmonic, then two thresholds can be applied, one for the number of main harmonic positions identified and also an additional threshold to the number of sidebands identified. Alternatively, the signature can be considered significant if the signature index (discussed below) is above a threshold value.

In block 375, the sum of spectral amplitudes, $S_b$, is computed over frequency bands around the theoretical fault frequencies. In block 377, the calculated similarity index is compared to the similarity index threshold. If the calculated similarity index is smaller than the similarity index threshold, the process continues to block 379, described below. If, however, the calculated similarity index is not smaller than the similarity index threshold, the process continues to block 389 where the determined sum of spectral amplitudes is compared to the spectral amplitude sum threshold. If the determined sum of spectral amplitudes is less than the spectral amplitude sum threshold, the process continues to block 391, and a possible false pass condition exists.

If however, the determined sum of spectral amplitudes is not less than the spectral amplitude sum threshold, the process continues to block 393, and a possible fault is indicated. An alarm can be generated in block 395 to alert a user to the possible fault condition. Of course, the type and variety of alarm can be customized depending upon the severity of the similarity index comparison and the spectral amplitude sum comparison. When a possible false pass is indicated in block 391 or an alarm is generated in block 395, users can review operating conditions of the system in block 385 and/or review the manner in which the threshold determinations were made in block 387.

As indicated above, in block 379 the sum of the determined amplitudes $S_b$ is compared to the spectral amplitude sum threshold. If the sum of the determined amplitudes is less than the sum threshold, it is indicative of proper machine operation, and the process continues to block 381, and no fault is indicated. If, however, in block 379 the sum of amplitudes is not less than the threshold, it is indicative of a possible false alarm as shown in block 383. Once a possible false alarm is noted, users can review operating conditions of the system in block 385 and/or review the manner in which the threshold determinations were made in block 387.

Figure 2:
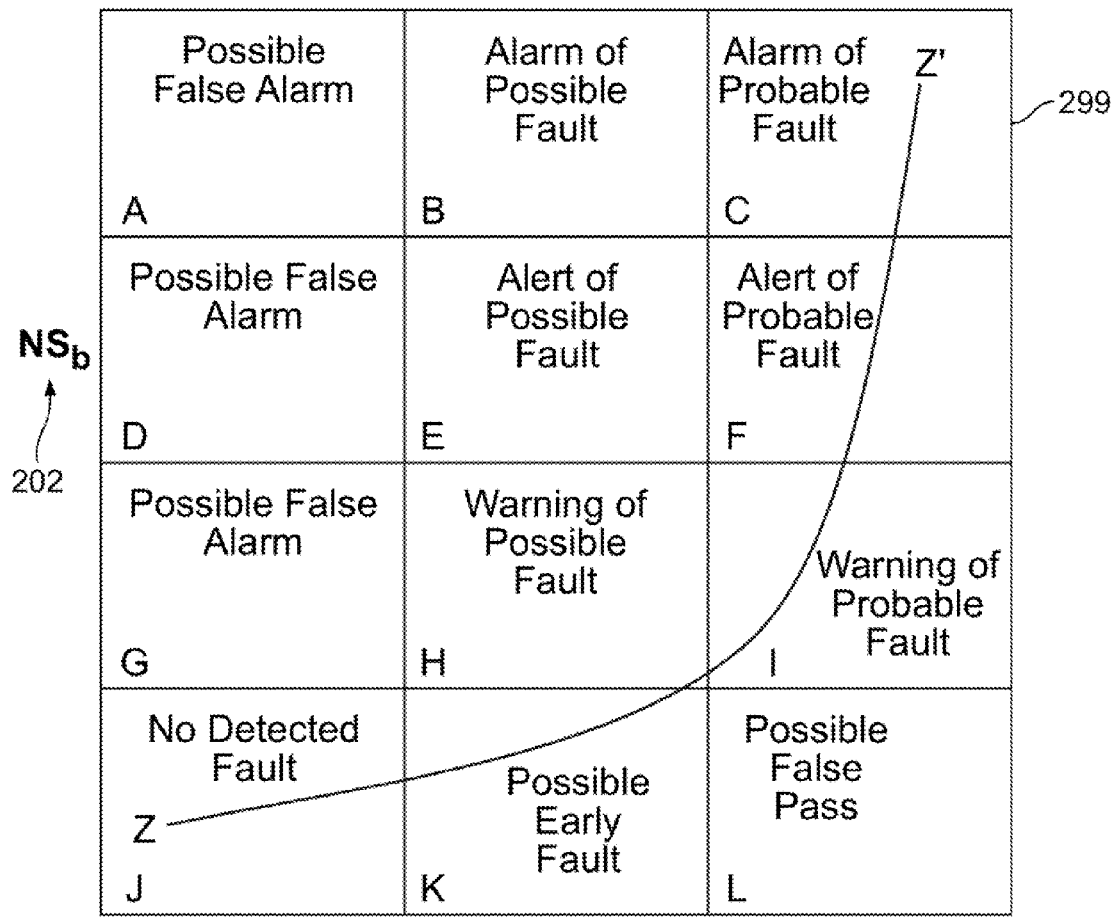
FIG. 2 is a scatter plot of normalized amplitude values $NS_b$ versus signature index values $S_i$ depicting different general system operating conditions.

The value $S_b$—spectral amplitude, discussed above—is a commonly used measure of an indication as to the severity of the component fault. A useful way to display these values is as a scatter plot of a normalized $S_b$ ($NS_b$) versus the similarity index $S_i$. In FIG. 2, the normalized spectral amplitude 202, which is akin to the normalized fault severity amplitude, is plotted along the vertical axis, and the similarity index 212 is plotted along the horizontal axis. The normalization can be relative to a threshold value, so a high normalized $NS_b$ (such as in sections A, B, and C in FIG. 2) would represent a potential alarm state. The plot is populated with a collection of amplitude/index pairs, examples of which are shown along the line from Z to line Z'. The collection can be from all historical values of a given machine component fault signature or can be a collection from all machinery components.

FIG. 2 shows an example of a scatter plot of normalized amplitude values versus signature index values depicting different general alarm generation conditions. This plot is a convenient method to display whether a significant signature is present and also whether the amplitude of the sum of spectral amplitudes is larger than expected indicating that a component fault is developing. A typical trajectory of a developing fault is shown along the line from Z to Z', which begins in the lower left corner (shown as reference element J) of the grid 299 in the no defect region (reference element J). As a fault develops, the trajectory moves right along line Z to Z' to the section labeled as reference element K. In this section K, the plot of normalized amplitude values versus signature index values shows a possible early fault. As the developing fault continues, the trajectory moves from section K to section 1 as the similarity grows to the probable early fault region, and then progresses in severity as the plot of normalized amplitude values increase and the trajectory of the line from Z to Z' moves into section F, where an alert of a probable fault is warranted and then moves to section C, where an alarm of a probable fault is indicated as the fault progresses in severity.

The regions A, D, and G toward the upper left of grid 299 are the possible false alarm regions. These are areas of higher than normal amplitude with a low similarity index, indicating that the signature is not truly present.

Points in the lower right corner section L are possible false passes. Points in this section represent a condition where a point in which the signature is clearly present, but the amplitudes are low relative to the threshold value. This could be due to an incorrectly defined threshold, for example.

Additionally, sections B, E, and H of grid 299 represent those points where the normalized amplitude is high and the similarity index is in the mid-range. These sections B, E, and H are areas where an alarm of a possible fault is indicated (section B), where an alert of a possible fault is warranted (section E), and where a warning of a possible fault is shown (section H).

Figure 5:
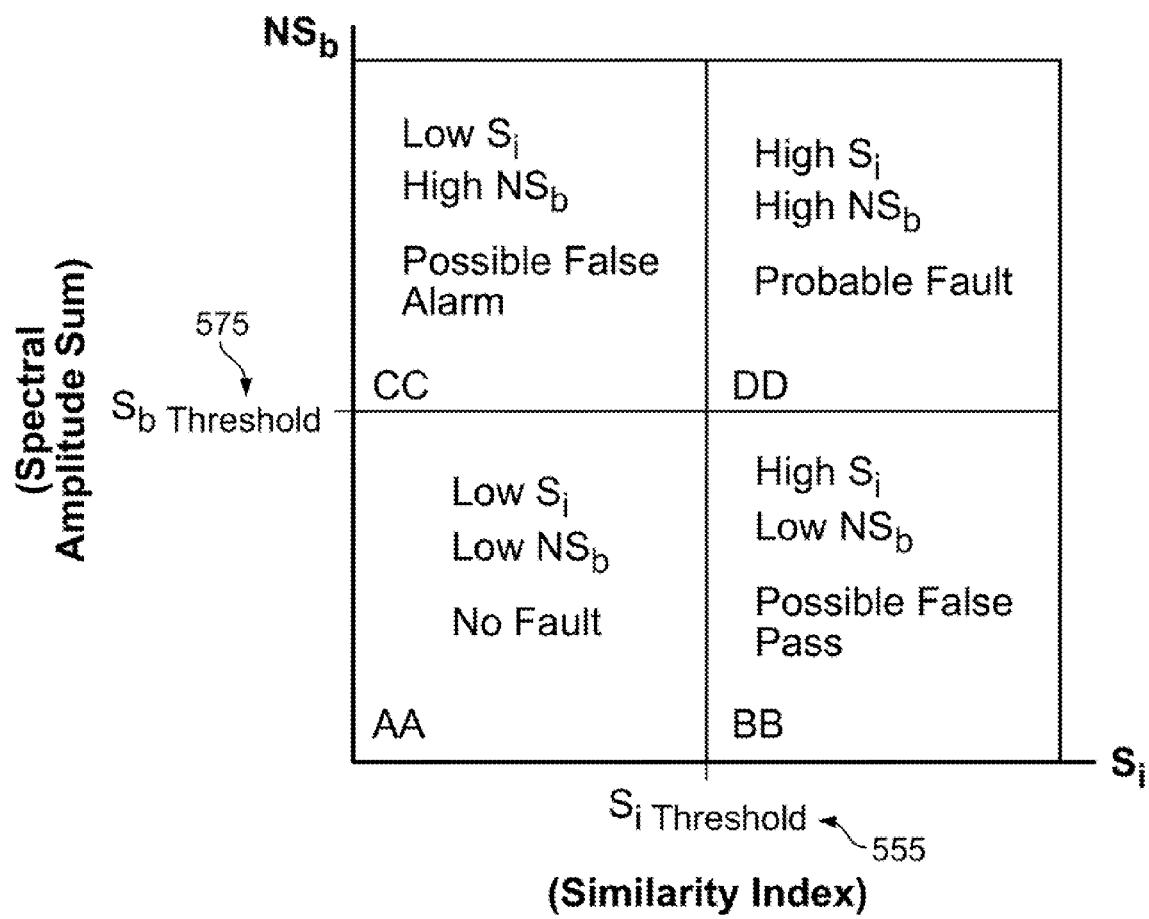
FIG. 5 illustrates a matrix of likely operational conditions based upon the combination of the similarity index values and the number of detected peaks in a frequency spectrum.

FIG. 5 provides a summary chart of the possible operating conditions as determined from the evaluation of the similarity index and the sum of the spectral amplitudes. Similarity index is plotted on the x-axis, and the spectral amplitude sum is plotted on the y-axis.

For example, if the computed similarity index is less than the similarity index threshold (shown as reference numeral 555), and the spectral amplitude sum is less than the sum threshold, the operating condition will be that as shown in quadrant AA, where there is no machine fault indicated. That is: 1) there is little similarity between the measured frequency spectrum and the theoretical fault spectrum; and 2) the spectral amplitude sum is low, indicating that whatever frequencies generated peak amplitudes, the sum of those amplitudes was low.

If the computed similarity index is less than the similarity index threshold (shown as reference numeral 555), and the spectral amplitude sum is greater or equal to the sum threshold 575, the operating condition will be that as shown in quadrant CC, where there is an indication of a possible false alarm. That is: 1) there is little similarity between the measured frequency spectrum and the theoretical fault spectrum; but 2) the spectral amplitude sum is high, indicating that whatever frequencies generated peak amplitudes, the sum of those amplitudes was high relative to the threshold.

If the computed similarity index is greater or equal to the similarity index threshold (shown as reference numeral 555), and the spectral amplitude sum is less than the sum threshold, the operating condition will be that as shown in quadrant BB, where there is an indication of a possible false pass. That is: 1) there is high similarity between the measured frequency spectrum and the theoretical fault spectrum; but 2) the spectral amplitude sum is low, indicating that whatever frequencies generated peak amplitudes, the sum of those amplitudes was low relative to the threshold.

If the computed similarity index is greater or equal to the similarity index threshold (shown as reference numeral 555), and the spectral amplitude sum is greater or equal to the sum threshold 575, the operating condition will be that as shown in quadrant DD, where there is an indication of a probable fault.

That is: 1) there is high similarity between the measured frequency spectrum and the theoretical fault spectrum; and 2) the spectral amplitude sum is high, indicating that whatever frequencies generated peak amplitudes, the sum of those amplitudes was high.

The detection of a statistically significant signature allows for a much more accurate band sum. Instead of summing all the amplitudes falling in the bands around the theoretical frequencies, only the amplitudes associated with the peaks matching a signature are added. If no frequency matches occur, then the signature amplitude $S_a=0$. If matches are present then:

$S_a = \Sigma_i(A(i))$ where the peak $i$ is a match to the signature set $H(s_{max})$ It is clear that the value $S_a$ can be substituted for the value $S_b$ in this discussion and the same method can be employed to determine the no detection, true detection, false alarm and false pass states.

The similarity index amplitude $S_a$ is a much more robust indicator of a component fault than using solely the spectral amplitude value $S_b$, which is a sum of all amplitudes in the band regions around the theoretical frequencies regardless of any matches. Based upon the similarity index comparison and the spectral amplitude sum comparison, an operator can determine the status of the machine and determine if additional courses of action should be taken.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

What is claimed is:

1. A method for detecting a spectral signature of a machine and declaring a detection condition comprising:
    identifying peak amplitudes in a frequency spectrum with a vibration analyzer;
    determining a corresponding frequency for each of the peak amplitudes;
    matching the determined corresponding frequencies to a theoretical set of frequencies in a database that correspond to a spectral signature of interest;
    determining a number of the matching frequencies;
    computing a sum of spectral amplitudes of the determined corresponding frequencies within frequency bands around the theoretical frequencies;
    comparing the computed sum of spectral amplitudes of the determined corresponding frequencies to a sum threshold;
    comparing the number of matching frequencies to a number threshold; and
    declaring a detection condition based upon the compared computed sum and the compared number of matching frequencies.

2. The method for detecting a spectral signature of claim 1, further comprising:
    removing known spectral leakage frequencies from the frequency spectrum.

3. The method for detecting a spectral signature of a machine and declaring a detection condition of claim 1 further comprising:
    applying a pitch detection filter to the frequency spectrum to identify harmonic sets of frequencies present in the frequency spectrum that are distinct from the spectral signature of interest; and
    removing the distinct harmonic sets of frequencies from the frequency spectrum.

4. The method for detecting a spectral signature of claim 3, wherein
    applying pitch detection to the identified peak amplitudes in the frequency spectrum includes applying at least one of an autocorrelation, a cepstrum, and a harmonic product spectrum to identify the harmonic sets of frequencies.

5. The method for detecting a spectral signature of a machine and declaring a detection condition of claim 1 further comprising:
    declaring a probable fault detection condition when the number of matching frequencies is at or above the number threshold and the computed sum of spectral amplitudes is at or above the sum threshold.

6. The method for detecting a spectral signature of a machine and declaring a detection condition of claim 1 further comprising:
    declaring a no fault detection condition when the number of matching frequencies is below the number threshold and the computed sum of spectral amplitudes is below the sum threshold.

7. The method for detecting a spectral signature of a machine and declaring a detection condition of claim 1 further comprising:
    declaring a false alarm condition when the number of matching frequencies is below the number threshold and the computed sum of spectral amplitudes is at or above the sum threshold.

8. The method for detecting a spectral signature of a machine and declaring a detection condition of claim 1 further comprising:
    declaring a false pass condition when the number of matching frequencies is at or above the number threshold and the computed sum of spectral amplitudes is below the sum threshold.

9. The method for detecting a spectral signature of claim 1 further comprising:
    periodically comparing over time the computed sum of spectral amplitudes of the determined corresponding frequencies; and
    characterizing a developing component fault when the periodical comparison over time of the computed sum of spectral amplitudes is increasing.

10. The method for detecting a spectral signature of a machine and declaring a detection condition of claim 1 further comprising:
    applying a squashing function to the number of the identified peak amplitudes that match the theoretical set of frequencies; and
    producing a similarity index based upon the applied squashing function.

11. The method for detecting a spectral signature of a machine and declaring a detection condition of claim 10, wherein the similarity index is between the range of 0 to 1, and wherein no matches of identified peak amplitudes to the theoretical set of frequencies corresponds to a similarity index of substantially 0 and all matches of identified peak amplitudes to the theoretical set of frequencies corresponds to a similarity index of substantially 1.

12. The method for detecting a spectral signature of a machine and declaring a detection condition of claim 10 further comprising:
   computing a sum of spectral amplitudes in frequency bands around the theoretical set of frequencies subject to the squashing function;
   applying a sum threshold to the computed sum of spectral amplitudes in frequency bands around the theoretical set of frequencies subject to the squashing function;
   applying a similarity threshold to the produced similarity index; and
   declaring a final detection condition based on the computed sum and the produced similarity index.

13. The method for detecting a spectral signature of a machine and declaring a detection condition of claim 12 further comprising:
   declaring a probable fault condition when the computed sum is at or above the sum threshold and the produced similarity index is at or above the similarity threshold.

14. The method for detecting a spectral signature of a machine and declaring a detection condition of claim 12 further comprising:
   declaring a false alarm condition when the computed sum is at or above the sum threshold and the produced similarity index is below the similarity threshold.

15. The method for detecting a spectral signature of a machine and declaring a detection condition of claim 12 further comprising:
   declaring a false pass condition when the computed sum is below the sum threshold and the produced similarity index is at or above the similarity threshold.

16. The method for detecting a spectral signature of a machine and declaring a detection condition of claim 12 further comprising:
   declaring a no fault condition when the computed sum is below the sum threshold and the produced similarity index is below the similarity threshold.

17. The method for detecting a spectral signature of a machine and declaring a detection condition of claim 1 further comprising:
   removing known interfering frequencies from the frequency spectrum.

18. The method for detecting a spectral signature of a machine and declaring a detection condition of claim 1 further comprising:
   altering the theoretical set of frequencies that correspond to the spectral signature of interest using a scale factor, wherein the scale factor is determined by fitting the frequencies of the matched frequencies to the theoretical set of frequencies to generate a maximum number of matching frequencies.

19. The method for detecting a spectral signature of claim 18 further comprising:
   iteratively determining a deviation between a scaled theoretical frequency and a peak amplitude of a corresponding frequency of the frequency spectrum.

20. The method for detecting a spectral signature of a machine and declaring a detection condition of claim 18, wherein the scale factor is based upon an uncertainty in a rotational speed of the machine from which the spectral signature is generated.

21. The method for detecting a spectral signature of a machine and declaring a detection condition of claim 1, wherein the theoretical set of frequencies includes a base harmonic frequency and a set of sideband frequencies;
   wherein the number of matched frequencies includes a number of matched base frequencies that correspond to the base harmonic frequency and a number of matched sideband frequencies that correspond to the set of sideband frequencies; and
   wherein the detection condition is declared based on the computed sum of the spectral amplitudes, the number of matched base frequencies that correspond to the base harmonic frequency, and the number of matched sideband frequencies that correspond to the set of sideband frequencies.

22. A system for detecting a spectral signature of a machine and declaring a detection condition comprising:
   a vibration sensor operatively coupled to the machine and configured to detect a vibration of the machine and to generate a representation of the vibration;
   a non-transitory computer readable storage medium configured to include a theoretical set of frequencies that correspond to a spectral signature of interest;
   a vibration analyzer configured to receive the generated representation of the machine vibration from the vibration sensor and further configured to:
      identify peak amplitudes in the generated representation;
      determine a corresponding frequency for each of the peak amplitudes;
      match the determined corresponding frequencies to the theoretical set of frequencies stored on the computer readable media;
      determine a number of matching frequencies; and
      compute a sum of spectral amplitudes of the determined corresponding frequencies within frequency bands around the theoretical frequencies;
      compare the computed sum of spectral amplitudes of the determined corresponding frequencies to a sum threshold;
      compare the number of matching frequencies to a number threshold; and
      declare a detection condition based upon the compared computed sum and the compared number of matching frequencies.

23. An article of manufacture comprising a non-transitory computer-readable data storage medium including computer-readable instructions stored thereon for causing a processor to perform a method of detecting a spectral signature of a machine and declaring a detection condition, the method comprising:
   identifying peak amplitudes in a frequency spectrum;
   determining a corresponding frequency for each of the peak amplitudes;
   matching the determined corresponding frequencies to a theoretical set of frequencies that correspond to a spectral signature of interest;
   determining a number of the matching frequencies;
   comparing the number of matching frequencies to a number threshold;
   computing a sum of spectral amplitudes of the theoretical frequencies;
   comparing the computed sum of spectral amplitudes to a sum threshold; and
   declaring a detection condition based upon the compared computed sum and the compared number of matching frequencies.

* * * * *